UNITED STATES PATENT OFFICE.

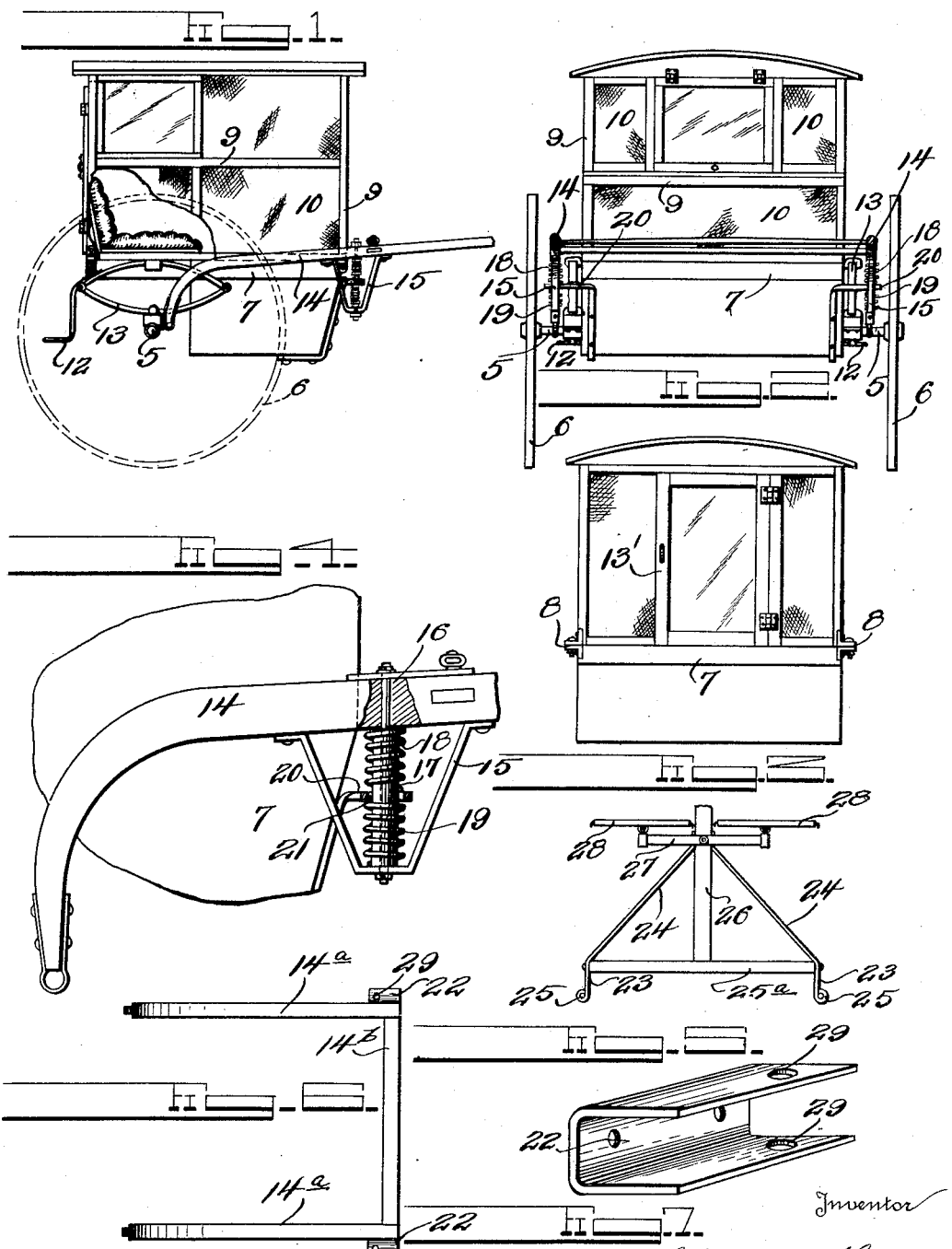

CHARLES J. SHIMON, OF SOLON, IOWA.

VEHICLE.

1,113,060.  Specification of Letters Patent.  Patented Oct. 6, 1914.

Application filed March 14, 1914. Serial No. 824,629.

*To all whom it may concern:*

Be it known that I, CHARLES J. SHIMON, a citizen of the United States of America, residing at Solon, in the county of Johnson and State of Iowa, have invented certain new and useful Improvements in Vehicles, of which the following is a specification.

This invention relates to vehicles and more particularly to a vehicle of a type particularly adapted for the use of rural mail carriers, though it is apparent that it may be used for other purposes if so desired.

The object of the invention is to provide a light, easily handled vehicle adapted to be readily converted from an open to a closed cart, in which the shock incident to travel over rough roads will be reduced to a minimum, in which the vehicle may be readily and quickly converted from a one-horse to a two-horse vehicle and one in which the entire top of the vehicle is formed of a skeleton frame work and a fabric with suitable sight openings and doors, and windows therein.

Further objects and advantages of the invention will be set forth in the detailed description which now follows.

In the accompanying drawing, Figure 1 is a side elevation of a vehicle constructed in accordance with the invention, Fig. 2 is a front elevation thereof, Fig. 3 is a rear elevation of a part thereof, Fig. 4 is a detailed view partly in side elevation and partly in section, illustrating a shock absorbing spring particularly adapted for use in connection with this vehicle, Fig. 5 is a partial plan view of a tongue structure adapted for use when it is desired to employ two horses, Fig. 6 is a detailed view of a pair of stub shafts hereinafter described and Fig. 7 is a detailed perspective view of a keeper hereinafter described.

Like numerals designate corresponding parts in all of the figures of the drawing.

Referring to the drawing, numeral 5 designates the axle and 6 the wheels of the vehicle. The body proper of the vehicle is indicated at 7, and has detachably mounted thereon at 8 the skeleton frame work 9 which, together with the canvas sides 10, and the celluloid or glass sight openings 11, complete the body of the vehicle. A step 12 and rear door 13' permit the entry of the driver to the vehicle. Portion 7 of the body is supported upon the springs 13. Shafts 14 are connected to the axle and extend forwardly therefrom. These shafts carry stirrups 15 and bolts 16 pass through these stirrups and through the shafts and hold in place pipe sections 17. These pipe sections are encircled by coil springs 18 and 19, the coil springs 18 bearing between the under side of the shafts and a casting 20 secured to the body 7, and the spring 19 bearing between said casting and the lower portion of the stirrup. Casting 20 has a slot 21 formed therein to permit the necessary vertical movement of the casting against the tension of the springs 18 and 19, to thereby take up the shock or jar in a manner that will be readily understood. It is sometimes desired to change a vehicle of this nature from a one-horse vehicle to a two-horse vehicle and to render it possible to readily do this I have provided a structure shown in Figs. 6 and 7. In this case the shafts 14$^a$ have been cut off at the usual cross bar 14$^b$ leaving the stub shafts shown, and to the sides of the forward ends of these stub shafts U shaped keepers 22 are secured.

The terminal ends 23 of braces 24 are provided with eyelets 25. These braces are secured at their forward ends to tongue 26 and at their rear portion, to the end of a cross bar 25$^a$ which carries the usual doubletree 27 and swingletree 28. When the structure just described is used the terminal ends 23 of the braces 24, are slipped into the keepers 22 and the eyelets 25 aline with openings 29 formed in the U shaped keepers, so that bolts (not shown) passed vertically through these openings and through said eyelets will lock the parts firmly and securely together.

By reason of the fact that the casting 20 is secured to the body 7 at a point considerably above the bottom of the vehicle, the jar is reduced to a minimum. Furthermore the parts shown are economical of construction sufficiently serving the purposes for which they are intended. It may be readily converted into a breaking cart by merely removing the skeleton top, it may be converted into a semi-closed body by opening the various windows, or into a completely closed body by closing the various openings.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:

1. A cart of the character described comprising the axle, wheels, shafts and body portion in combination with depending stirrups secured to the under side of said shafts and slightly in advance of the body portion, centrally arranged bolts passing through the shafts and through the bottom of said stirrups, tubular members through which said bolts pass, said tubular members extending and bearing between the stirrups and the under side of the shafts, a member affixed to the body portion and encircling and sliding upon said tubular member and springs bearing between said members and the under side of the shafts, and additional springs bearing between said members and said stirrups.

2. In a device of the character described the combination with a pair of stub shafts, of a cross-bar connecting said shafts, a pair of keepers secured to the other faces of said stub shafts in alinement with said cross-bar, said keepers being U shaped in cross section and having their free edges disposed outwardly and having alining openings formed vertically therein, a tongue, a cross bar carried by said tongue, a pair of braces engaging said tongue and said cross bar, said braces having terminal rear ends which project rearwardly beyond said cross bar and which are bent outwardly to form eyelets, said extensions being adapted to slidably enter said keepers and to have their eyelets vertically alined with the openings in said keepers substantially as set forth.

In testimony whereof I affix my signature in presence of two witnesses.

CHARLES J. SHIMON.

Witnesses:
WESLEY F. ULCH,
ANNA M. BECK.

---

Copies of this patent may be obtained for five cents each, by addressing the "Commissioner of Patents, Washington, D. C."